United States Patent [19]

Braun

[11] 3,977,564

[45] Aug. 31, 1976

[54] SEALING SLIDE FOR CONTAINERS

[76] Inventor: Oskar Braun, Wilhelmstrasse 41, 614 Bensheim, Bergstrasse, Germany

[22] Filed: Oct. 6, 1975

[21] Appl. No.: 619,707

[30] Foreign Application Priority Data
Oct. 18, 1974 Germany............................ 2449561

[52] U.S. Cl. ............................................. 220/346
[51] Int. Cl.² ........................................ B65D 43/20
[58] Field of Search..................... 220/345, 346, 232

[56] References Cited
UNITED STATES PATENTS 3,478,916  11/1969  Linden.............................. 220/345
3,623,627  1/1976  Bolton............................... 220/346

Primary Examiner—George T. Hall
Attorney, Agent, or Firm—Kinzer, Plyer, Dorn & McEachran

[57] ABSTRACT

This relates to a sealing slide for containers, such as liquid settling tanks, pressing tanks, high pressure containers and the like for the processing and treatment of fruits and juices of all kinds, wherein a sealable aperture is provided in the container jacket, on which the sliding lid can slide while sealing the aperture.

6 Claims, 3 Drawing Figures

SEALING SLIDE FOR CONTAINERS

SUMMARY OF THE INVENTION

Liquid settling and pressing tanks are known in the most diverse shapes, for example in the form of a cylinder, a polygon, a sphere, or the like, which have a pressing system as well as loading and discharge openings on the inside, whereby particularly such a sealable aperture is applied in the container jacket. The purpose of this aperture is either to remove from this opening the squeezed out mash or to load the container with the mash to be squeezed. Lids are known which with the use of a rubber seal are screwed sealingly to the opening. However, since the cover must be removed at certain intervals, this type of fastening is complicated, particularly when these containers reach certain dimensions where the opening and closing of the lid can no longer be accomplished from the floor. Moreover, so-called tapered, flat slides are known which can be opened or closed by a rectilinear movement with the aid of a sliding piston. The effect of this slide consists in that the corresponding adherence surfaces are of tapered design, but the production of such a seal is very expensive, as high precision is required for the machining of the sealing surfaces. Another disadvantage resides in the fact that residues of mash settle between these sealing surfaces, particularly pits and stems, so that such seals frequently become leaky.

The invention is based on the problem of proposing a sliding seal for such containers which makes possible an automatic closing and opening of the container aperture at little effort or expense and where a safe sealing of the container aperture is assured.

According to the invention this problem is solved in that the cover is provided with an outer cover panel and an inner ring exposing the aperture, a rubber diaphragm is sealingly clamped between the cover panel and the ring, and an air connection is provided from the outside in the area of the exposed membrane with guides for sliding the cover.

An advantageous embodiment consists in fastening an annular flange to the container aperture.

Moreover, it is possible to fasten the annular flange on a dome.

It is further proposed to fasten in the plane of the inner ring a disc at the cover panel within the ring, exposing therein an annular gap, and the annular gap is located with the lid closed in the area of the edge of the aperture and/or the flange.

Moreover, it is advantageous to provide as guides guide rods extending laterally at the lid in the direction of motion, along with corresponding eyes, whereby the rods are fastened to the outer cover panel by a transverse bridge.

It finally is proposed to apply bolts at the lid which engage into corresponding eyes laterally from the aperture.

The sliding seal according to the invention offers the important advantage that its manufacture is possible at low technical expense, while a safe sealing of the corresponding container opening is assured. In presses having a closed container and having as pressing means a so-called elastic membrane which is pressed by means of compressed air or hydraulic pressure into the interior of the container, whereby said membrane is located at one front wall of the container and a screen bottom is arranged at the opposite front wall, through which the juice can discharge, this embodiment is particularly advantageous, as for the operation of the rubber membrane located in the cover, the necessary pressure medium already is available. This substantially applies also to other containers where such a pressure medium is present, like for example in so-called high pressure tanks where juices are treated for example under the influence of pressure.

The invention is explained more in detail in the following specification, with the aid of embodiments exemplified in the drawings.

DESCRIPTION OF THE PREFERRED EMBODIMENTS

Figure 1:
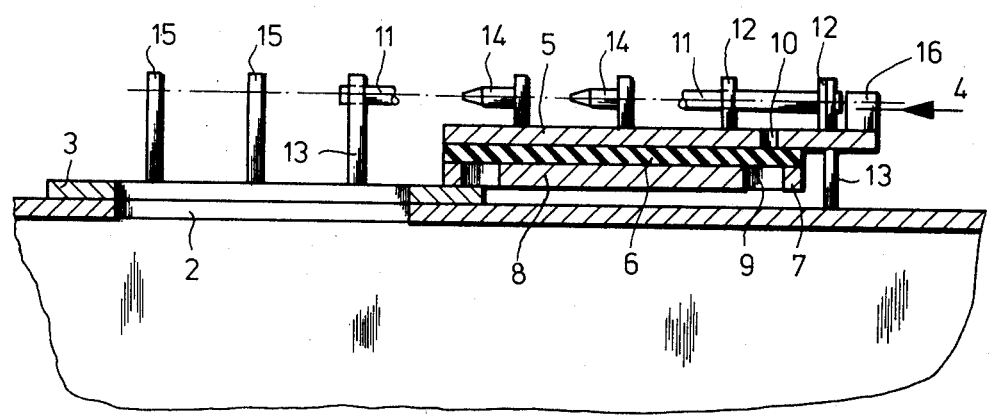
FIG. 1 is a partial longitudinal section through a container with the sealing slide.
Figure 2:
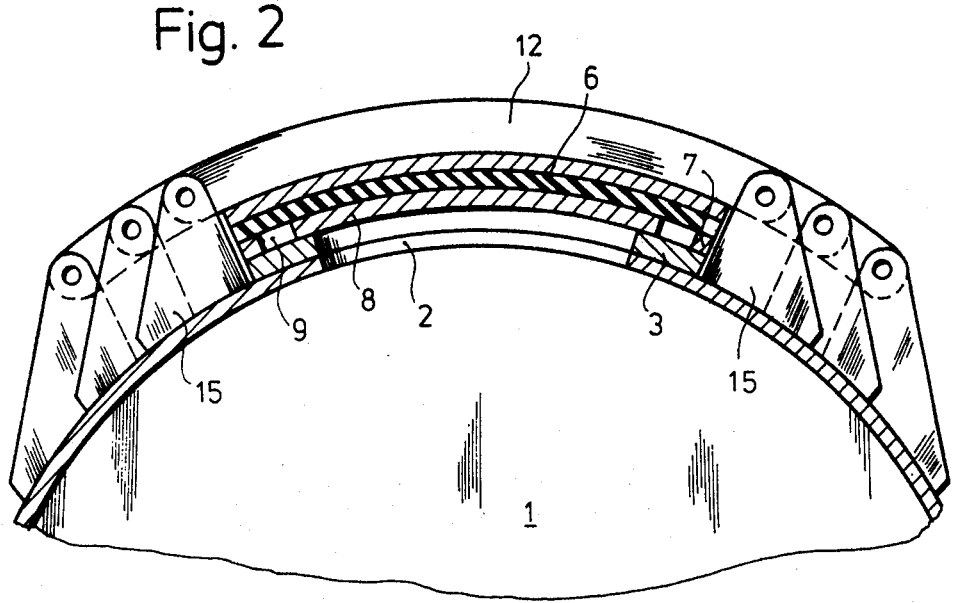
FIG. 2 is a partial cross section through the container with the opening sealed.

The drawing represents a fluid settling and pressing container 1 with circular cross section, provided with a sealable aperture 2. A flange 3 is mounted and/or fastened at the container 1.

The lid slidable in the direction of the arrow 4 (FIG. 1) comprises an outer covering panel 5, a subjacent rubber membrane 6 and an additional two-part cover, namely an outer ring 7 and an inner disc 8, whereby an annular gap 9 remains between the disc 8 and the outer ring 7. The outer ring 7 and the disc 8 are fastened at the outer cover panel 5, so that thereby the rubber membrane 6 located therebetween is clamped in sealingly toward the outside. An air connection 10 is placed in the area of the annular gap 9 at the outer cover panel 5, as a result of which with the lid closed, by application of the pressure medium, the rubber membrane 6 is pressed at the annular gap 9 inwardly against the flange 3, thus establishing a tight seal.

Two lateral guide rods 11 are fastened at the outer cover panel 5 of the lid. They are applied with the aid of a transverse bridge 12 and guided in corresponding eyes 13 applied laterally from the opening 2. To determine the terminal position, namely the closing position of the lid, a numer of bolts 14 also are fastened to the lid which coact with corresponding eyes 15 laterally from the container aperture 2. The sliding movement of the cover can be accomplished with the aid of the pneumatic or hydraulic cylinders which engage at a holding means 16.

Figure 3:
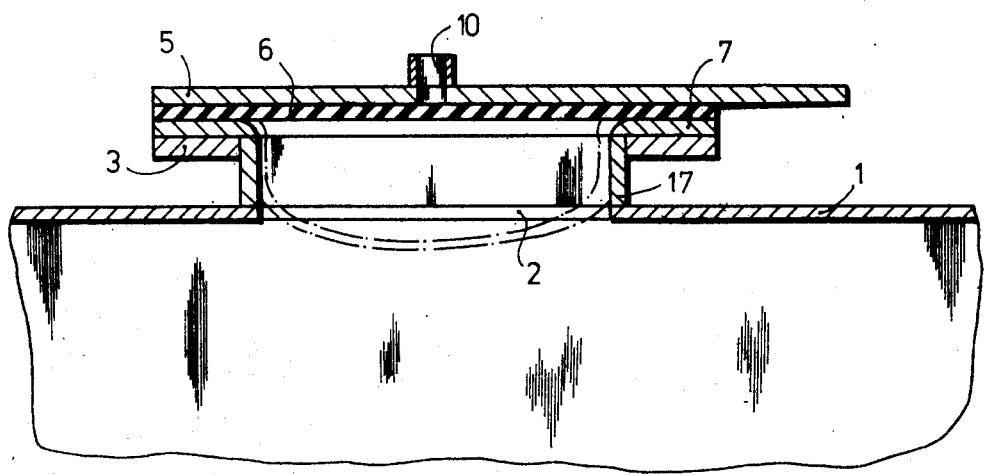
FIG. 3 is a partial longitudinal section through a container with another embodiment for the sliding seal.

FIG. 3 shows an additional embodiment of such a sliding seal. This is a simplified embodiment which can be applied particularly wherever sufficient back pressure is present within the container 1. In this embodiment the membrane 6 is merely clamped between the outer cover panel 5 and an outer ring 7 and can expand in the area of opening 2 inwardly into the container. Here it is appropriate to apply to the container opening 2 a dome 17 to which the flange 3 is fastened. The pressure medium is applied at the connection 10 so that the membrane 7 adheres inwardly into the opening 2. Due to the back pressure prevailing in the container 1 the membrane or diaphragm then adheres to the inner wall means of the dome 17 and closes the opening 2 of the container 1 tightly.

The embodiments of the invention in which an exclusive property or privilege is claimed are defined as follows:

1. A sealing slide at containers, such as liquid settling tanks, pressing tanks, high pressure tanks and the like, for example, for the processing and treatment of fruits and juices of all kinds, wherein a sealable aperture is provided in the container jacket on which a sliding lid can slide while sealing the aperture, characterized by and including a cover with an outer cover panel (5) and an inner ring (7) exposing the aperture (2), a rubber diaphragm (6) sealingly clamped between the cover panel (5) and the ring (7), an air connection (10) from the outside in the area of the exposed membrane (6), and guides (11,13) for sliding the cover (5,6,7).

2. The sealing slide according to claim 1, characterized by the fact that an annular flange (3) is fastened at the container opening (2).

3. The sealing slide according to claim 2, characterized by the fact that the annular flange (3) is fastened to a dome (17).

4. The sealing slide according to claim 3, characterized by the fact that in the plane of the inner ring (7), a disc (8) is fastened at the cover panel (5) within the ring, exposing therein an annular gap (9), the annular gap (9) being located with the lid closed (5,6,7,8) in the area of the edge of the opening (2) and flange (3).

5. The sealing slide according to claim 4, characterized by and including guide rods (11) extending laterally at the cover (5,6,7,8), along with corresponding eyes (13), whereby the rods (11) are fastened to the outer cover panel (5) by a transverse bridge (12).

6. The sealing slide according to claim 5, characterized by and including bolts (14) at the lid (5,6,7,8) which engage into corresponding eyes (15) laterally from the aperture (2).

* * * * *